Feb. 11, 1969  KOJIRO YAMAOKA  3,426,485

METHOD OF CHAMFERING THE TEETH OF A GEAR

Filed Sept. 16, 1964

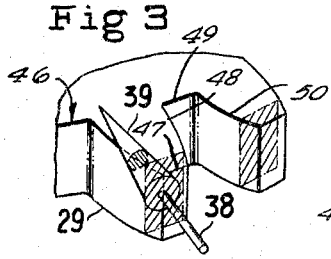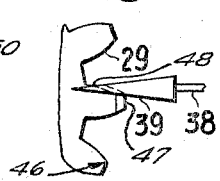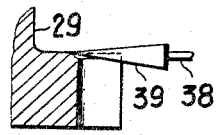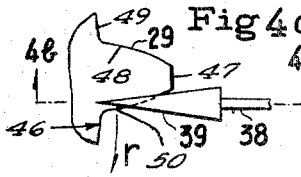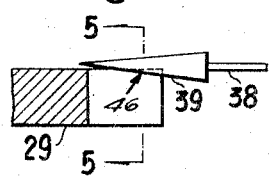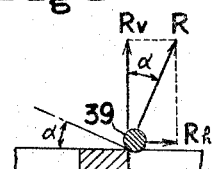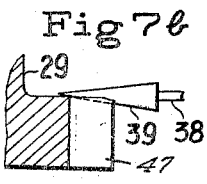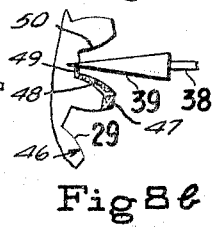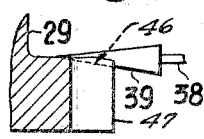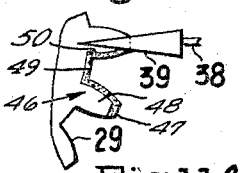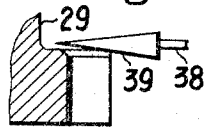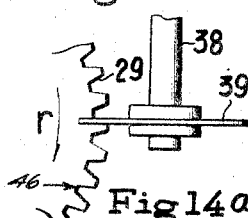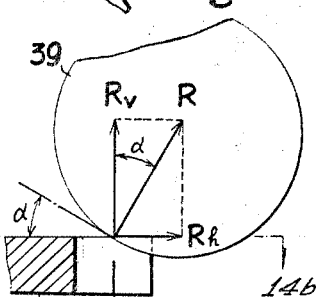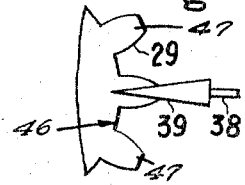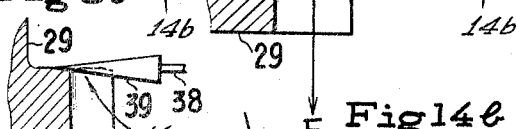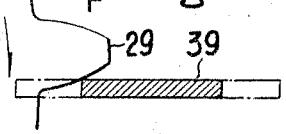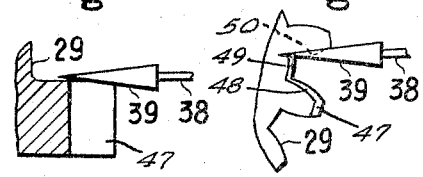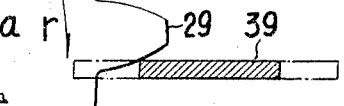

United States Patent Office 3,426,485
Patented Feb. 11, 1969

3,426,485
METHOD OF CHAMFERING THE TEETH OF A GEAR
Kojiro Yamaoka, 24—2, Wakamatsu-cho, Nishinomiya, Hyogo Prefecture, Japan
Filed Sept. 16, 1964, Ser. No. 396,865
Claims priority, application Japan, Oct. 31, 1963, 38/82,537
U.S. Cl. 51—287     5 Claims
Int. Cl. B24b 1/00, 5/00, 17/00

This invention relates to the automatic method of gear chamfering and its arrangement suitable for ridging and shaping of various kind of gears such as plain gears, shoulder gears, shaft gears, bevel gears and etc., and more especially to the method of gear chamfering and its arrangement in such a manner as while the processing gear is moving at low speed the tool moves at high speed allowing it to move up and down freely with its fulcrum as the center and to contact with a profile edge portion of the processing gear.

There have been various ways of doing chamfering but each has its own merits and demerits. For example, methods are known by means of which an annular wire brush merely does cleaning but not chamfering. In other known methods a bob-type file, bob-type whetstone or hollowmill cutter are used with extreme difficulty to form the gear. In one method a whetstone is fixed on the end of a rod that moves reciprocatingly to let the whetstone contact with the surface of the processing gear and to polish and cut the gear. In the last mentioned method hand operation makes the shaping difficult and the finish is not always uniform. Automatic operation makes the arrangement rather complicated and therefore is not practical.

This invention makes it possible to chamfer a profile edge portion of a gear automatically by the use of ordinary column-shaped, conical, conical-plate-shaped or disc-shaped tools such as drill, whetstone and file and aims at carrying out the operation speedily and accurately by its simple arrangement enabling the use of various differently-shaped tools of different quality which enable easy chamfering plain gears, shoulder gears, shaft gears, and bevel gears, and also enabling a smooth operation without bringing any exta force upon the processing gear and the tool.

The other objectives and effects will be clear in the following-statement.

This invention deals in the method of gear chamfering, in that the tool such as drill, whetstone or file moving freely up and down at high speed with its fulcrum as the center and contacts a profile edge portion of a processing gear moving at low speed; the processing gear by means of moving at low speed as aforesaid changes its contacting surface from one place to another in order; the tool moves up and down with the aforesaid fulcrum as the center tracing the shape of the profile edge portion of the processing gear and, as the result, one side of the processing gear is continuously and automatically chamfered.

This device also relates to apparatus for gear chamfering in which the tool moving freely up and down at high speed with its fulcrum as the center is provided and, at the same time, the arrangement to move the processing gear at low speed is also provided, through which means the surface of the processing gear in motion contacts with the aforesaid tool; then, as the processing gear moves, the said contacting surface moves in order up and down from one place to another and the tool moves freely up and down with the aforesaid fulcrum as the center tracing the shape of the surface of the processing gear, through which means, one side of the processing gear is continuously and automatically chamfered.

With regard to the shape of the said tool, any of the column-shaped, disc-shaped, conical, conical-plate-shaped tools will do and the tool itself may be fixed on the toolholding body that moves up and down with its fulcrum as the center.

This invention will be further explained on the drawings attached hereto but what should be remembered is that the illustrated examples are merely specific and the invention is not limited to within the scope of those cited examples. FIG. 1 to FIG. 11 illustrate the first examples while FIG. 12 to FIG. 16 the second examples.

FIG. 3 shows a perspective view of the tool in engagement with a profile edge portion of the gear.

FIG. 4a is a plan view of the tool engaging the profile edge portion of the gear.

FIG. 4b represents a perspective view along the line 4b—4b in FIG. 4a.

FIG. 5 shows a view along the line 5—5 in FIG. 4b.

FIG. 6 to FIG. 11 indicate the progress of the chamfering profile edge portion of teeth of the gear, in that FIG. a shows a ground plan, FIG. b a cross section of FIG. a while the dotted portion the surface already finished polishing and cutting.

Figure 12:
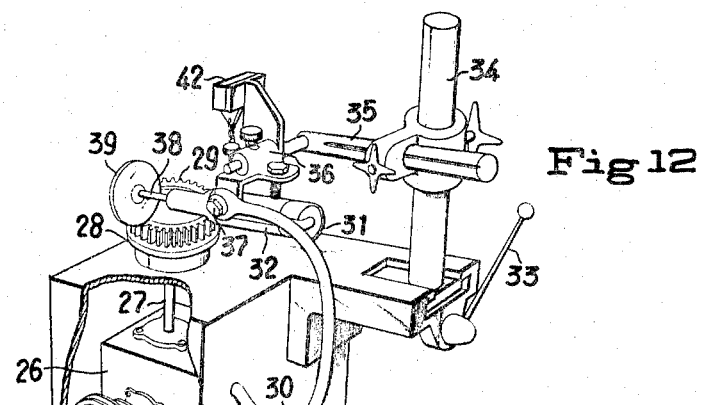

FIG. 12 shows a perspective view of a second embodiment of the invention.

FIG. 13 shows a plan view of a tool used in the embodiment of FIG. 12 in engagement with a profile edge portion of a gear.

FIG. 14a shows a side-view (partially cross-sectioned) of the gear and the tool.

FIG. 14b is a cross section along the line 14b—14b.

Figure 15:
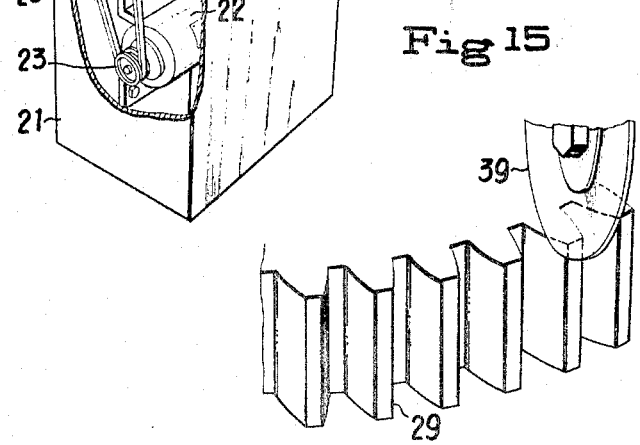

FIG. 15 indicates a side view of the processing gear against the tool.

Figure 16:
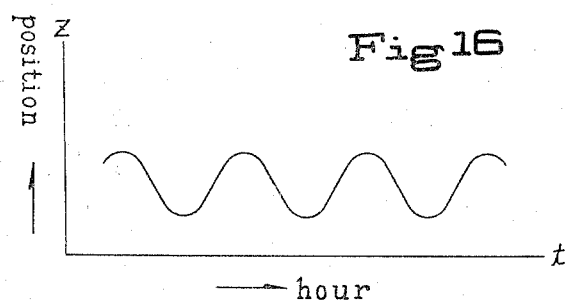

FIG. 16 is a graph schematically illustrating a shifting of the area of engagement of the profile edge portion of the gear and a tool, in which the vertical line (z) indicates a radical position of engagement between the gear and tool while the horizontal line (t) time.

Explanation is hereby given on the first embodiment shown in FIG. 1 to FIG. 11. 21 shows a casing while 22 a motor. 23 is a pulley driven by the motor 22. 24 shows a pulley driven by belt 25. 26 is a reduction gear box and, by the driving arrangement existing in the box, a rotating shaft 27 rotates. 28 illustrates the table on which the processing gear, i.e. the shoulder gear 29, mounts. 30 is a conduit to conduct air to drive the air motor 32 that forms a part of the moving tool body. 33 is the control handle which controls movement of a stand 34 and actuation of a switch. 34 is the stand holding the movable tool holder 31. 35 is the regulating rod that enables selective adjustment of the distance between the stand 34 and the moving tool holder 31. 36 is the arm supporting the said moving tool holder 31 by means of the pin 37 to enable the moving tool holder moving up and down. 38 is the rotating shaft of the tool, i.e. the conical whetstone 39. 40 is the spring that gives the force F (see FIG. 5) to the moving tool holder 31 and the force F can be readjusted by means of screwing-in and -up of the setting rod 41, 42 is the magnet.

Figure 1:
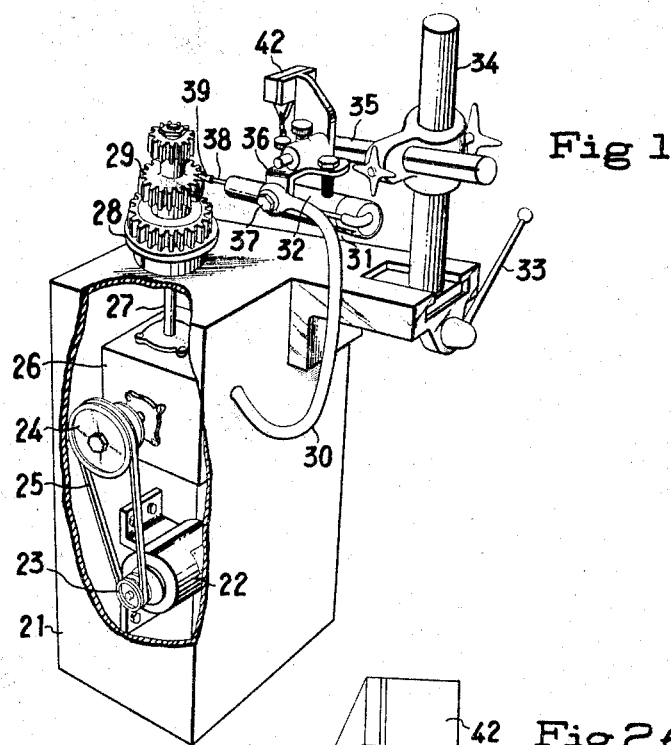
FIG. 1 shows a perspective view of a preferred embodiment of a preferred machine for chamfering a profile edge portion of a gear, the casing for the machine being partially broken away for clarity of illustration.
Figure 2B:
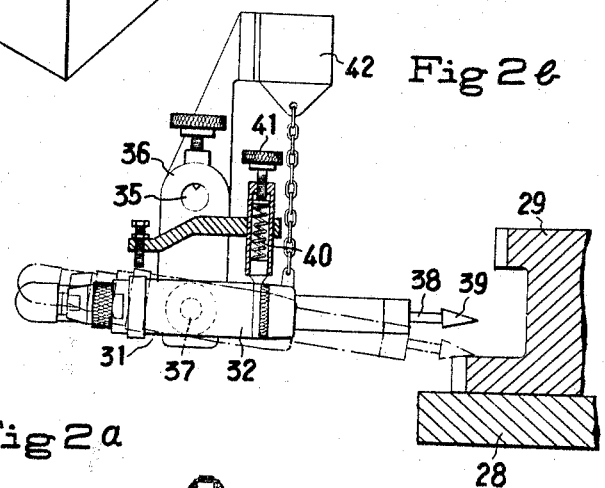
FIG. 2b is a center cross section of the tool holder in dashed lines, a position in which a tool engages a gear.
Figure 2A:
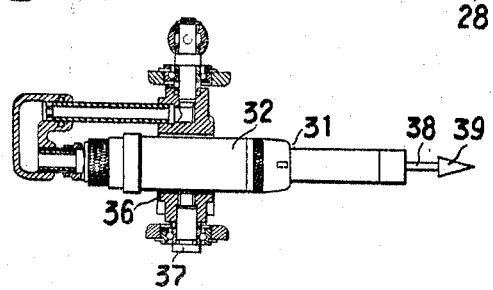
FIG. 2a is a center cross section of a tool holder.

When the tool 39 approaches to the cutting position of the processing gear 29 by turning the combined switch and control handle 33 in to motion, the air motor 32 and the table 28 start motion and, at the same time, the said magnet 42 is switched off, then the tool 39, by virtue of the pressing force of the spring 40, is pressed downward as shown by chain line in FIG. 2b making the pin 37 as the fulcrum and contacts with the surface of the processing gear. When magnet 42 is switched in, the tool 39, by overcoming the pressing force F of the spring 40, is pushed upward a little from the cutting position with the pin 37 as the fulcrum as shown by the solid line in FIG. 2b.

When the tool 39 approaches to the cutting position of the processing gear 29 by giving a motion to combined switch and control handle 33, the air motor 32 starts motion and, at the same time, the said magnet 42 is switched off and the tool 39 is pushed downward by the spring 40 as shown by dashed line in FIG. 2b with the pin 37 as the fulcrum and contacts with a profile edge portion of the gear 29. Then, the motor 22, pulley 23, belt 25, pulley 24 provided in the casing 21, the reduction mechanism in the gear box 26 and the table 28 through the shaft 27 start motion at a given speed. The speed is preferably 1 to 10 rounds per minute. By the rotation of the table 28, the processing gear 29 mounting on the said table moves at the same speed. On the other hand the tool 39 whose position has been determined by the stand 34, regulating rod 35 and arm 36 and affixed on the end of the moving tool holder 31 contacts with the profile edge portion of the gear 29 and moves at high speed by the action of air motor 32. Suitable sped in this case will normally be 1,000—30,000 r.p.m. (the speed ranging from 3,000 to 20,000 r.p.m. is most preferable). In the case of the tool 39 being drill or file, the suitable speed will be 40–400 metres/sec. (preferably 80–100 metres/sec.) while in the case of whetstone, the speed 500–5,000 metres/sec. (preferably 1,000–1,500 metres/sec.). It is advisable that the tool 39 be arranged pressing the profile edge portion lightly. This pressing force F can be controlled by the elasticity of a brasing spring 40 by means of screwing-in and -up of the setting rod 41. In this way, when the processing gear 29 and the tool 39 start contact movement on the respective different centers (in a state of crossing right-angled), the tool 39 in motion properly presses its surface upon the profile edge portion of the teeth of the processing gear 29 and, on account of rotation of the processing gear 29, keeps on cutting and polishing of the profile edge portion of the gear by moving to a given direction (almost up and down-wards) with the pin 37 as the fulcrum tracing the variations in the profile edge portion of the gear.

As shown in FIG. 5, the tool 39, in accordance with the contact angle of the processing gear 29, is influenced by the working force R but, as it is not to move to the direction of horizontal component force Rh, the tool 39, in conformity with the angle α, becomes influenced by the vertical component force Rv of the working force R (strictly speaking, it stands for the moving direction component force of the tool 39), hence, in accordance with the balancing or otherwise with the pressing force F, it moves upward or downward. The arrow r in FIG. 4a indicates the movement direction of the processing gear 29.

The progress of the tool in chamfering the profile edge portion 46 of the gear 29 is illustrated in FIGS. 6a to 11b. In FIGS. 6a and 6b the crest or end 47 of a tooth is being chamfered. In FIGS. 7a and 7b the tool has moved on to the trailing flank or side 48 of the tooth and in FIGS. 8 and 9 to the root or base 49 of the tooth. In FIGS. 10a and 10b the leading flank or side 50 of the next tooth is being chamfered and in FIGS. 11a and 11b a return is made to the postion of FIGS. 6a and 6b. It should be noted that as the profile edge portion of a tooth is chamfered, an area of engagement between the tool 39 and the profile edge portion of the gear 29 is shifted longitudinally of the tool. Thus, in FIG. 6 a longitudinally inner area of the tool 39 is in engagement with the profile edge portion 46 of the gear, i.e., the crest 47 of the tooth. In FIG. 7 it can be seen that an intermediate area of the tool is in engagement with the profile edge portion of the gear, i.e the trailing flank 48. In FIGS. 8 and 9 an outer area of the tool is in engagement with the profile edge portion of the gear, i.e. the root 49 of the tooth.

Illustrating part of the foregoing performance in order, the order will become thus, viz FIG. 7, FIG. 8, FIG. 9, FIG. 10, FIG. 11.

When the table 28 has finished one round of motion and the chamfering of the processing gear 29 has subsequently been finished, the air motor and the table 28 automatically stop the motion and, at the same time, the magnet 42 is switched in, then the tool 39, by overcoming the pressing force F of the spring 40, is pushed upward a little with the pin 37 as the fulcrum as shown by the line in FIG. 2b.

In the case of the examples of first group, as a small versatile conical whetstone is employed as the tool 39, even such processing gears as shoulder gears, shaft gears etc. whose formation is rather complicated, can be cut and polished easily. Moreover, as the tool is rather small-sized, it is economical and the distribution of force can be carried out smoothly.

Next, explanations will be given below on the examples of second group in FIGS. 12–16.

With the exceptions of the tool 39 being disc-shaped, the processing gear 29 being plain gear and, therefore, the relating cutting position of the tool 39 and the processing gear 29 being different, the examples in the second group are just as same as those of the first group and, therefore, the numerals used to identify components of the second group examples are similar to those of the first group.

In the course of cutting operation, the tool 39, in a state of the tool 39 contacting with the processing gear 29, is influenced by the working force R of the processing gear 29 motivated by the contact angle of the tool 39 and the processing gear 29 as shown in FIG. 14a but it is not to move to the direction of its horizontal component force Rh, so that the tool 39, in conformity with the angle α, is influenced by the vertical component force Rv of the working force R (strictly speaking the component force of the moving direction of the tool 39). Therefore the area of engagement of the tool 39 and profile edge portion 46 of the gear and a point of balancing of the processing force F, moves up and down and draws a curve resembling the sine shown in FIG. 16. The arrow r in FIG. 14b indicates the moving direction of the processing gear 59.

The examples of the second group are suitable for processing the chamfering of the gears such as plain gears, shaft gears, shoulder gears, etc., whose other portions are not likely damaged by the tool 39.

Although several specific examples of the inventive concept have been described the same should not be construed as limited thereby to the specific features mentioned therein but to include various other equivalent features as set forth in the claims appended hereto. It is understood that any suitable changes, modifications and variations may be made without departing from the spirit and scope of the invention.

What I claim is:

1. A method of chamfering teeth of a gear, said method comprising the steps of: rotating a tool about a central axis of the tool; resiliently aggressively engaging a profile edge portion of the gear with the rotating tool; rotating the gear relative to the tool in continuation of said resiliently aggressive engagement whereby to bring profile edge portions of the teeth of the gear sequentially into engagement with the rotating tool; and whereby said tool continuously follows the profile edge portion of the gear to form a chamfer on said profile edge portion.

2. A method as set forth in claim 1 further including the method step of: pressing said rotating tool into engagement with the gear with substantially constant force.

3. A mehod as set forth in claim 1 further including the method step of: halting the rotation of the gear relative to the tool after a single revolution of the gear.

4. A method as set forth in claim 1 wherein: the gear is rotated at a first rate and the tool is rotated at a second rate, said second rate being substantially faster than said first rate.

5. A method as set forth in claim 1 wherein: an area of engagement between the profile edge portion of the gear and the rotating tool is shifted relative to the tool by pivoting the tool relative to the gear.

References Cited

UNITED STATES PATENTS

| | | | |
|---|---|---|---|
| 2,430,375 | 11/1947 | Upton | 51—52 |
| 2,682,065 | 6/1954 | Nelson et al. | 15—21 |
| 3,024,483 | 3/1962 | Brauer et al. | 15—21 |
| 3,064,290 | 11/1962 | Bleke | 15—21 |
| 189,505 | 4/1877 | Scully | 51—105 |
| 1,219,481 | 3/1917 | Peterson et al. | 51—287 X |
| 1,361,883 | 12/1920 | Littman | 51—108 |
| 2,126,990 | 8/1938 | Graves | 51—287 X |
| 2,836,016 | 5/1958 | Lowitz | 51—105 |
| 2,860,453 | 11/1958 | Frey | 51—105 |
| 3,077,060 | 2/1963 | Cooper | 51—105 |

LESTER M. SWINGLE, *Primary Examiner.*

U.S. Cl. X.R.

51—105; 90—1.4